(12) United States Patent
Jha et al.

(10) Patent No.: US 10,826,626 B2
(45) Date of Patent: Nov. 3, 2020

(54) WIRELESS COMMUNICATION FOR AIR DATA SYSTEM

(71) Applicant: ROSEMOUNT AEROSPACE INC., Burnsville, MN (US)

(72) Inventors: Ashutosh Kumar Jha, Karnataka (IN); Divakara Rao Vadada, Karnataka (IN); Naveen Kumar Veerabhadrappa, Karnataka (IN); Jordan William Nelson, Savage, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 16/427,626

(22) Filed: May 31, 2019

(65) Prior Publication Data

US 2020/0304217 A1 Sep. 24, 2020

(30) Foreign Application Priority Data

Mar. 22, 2019 (IN) .............................. 201911011201

(51) Int. Cl.
*H04B 17/15* (2015.01)
*G01L 19/08* (2006.01)
*H04Q 9/00* (2006.01)

(52) U.S. Cl.
CPC ............ *H04B 17/15* (2015.01); *G01L 19/086* (2013.01); *H04Q 9/00* (2013.01); *H04Q 2209/40* (2013.01); *H04Q 2209/86* (2013.01)

(58) Field of Classification Search
CPC ...... H04B 17/15; H04Q 9/00; H04Q 2209/40; H04Q 2209/86; G01L 19/086

(Continued)

(56) References Cited

U.S. PATENT DOCUMENTS 7,110,157 B2 * 9/2006 Beteille ............. B32B 17/10036
359/265
7,581,434 B1 9/2009 Discenzo et al.
(Continued)

FOREIGN PATENT DOCUMENTS

EP 3264103 A1 1/2018

OTHER PUBLICATIONS

Arinc, "Network Server System: ARINC Characteristic 763-2," Airlines Electronic Engineering Committee, Nov. 21, 2001, 92 pages.

(Continued)

*Primary Examiner* — Ojiako K Nwugo
(74) *Attorney, Agent, or Firm* — Cantor Colburn LLP

(57) ABSTRACT

Systems and methods for operating sensors in an aircraft are provided. Aspects include receiving, by a processor associated with a sensor, a first request to test a transmitter function of the sensor, transmitting a test message to one or more other sensors associated with the aircraft, and listening to a transmitter associated with each of the one or more other sensors to determine a transmitter status of the sensor, wherein the transmitter status of the sensor is a pass status based on receiving a confirmation from at least one of the one or more other sensors. Aspects also include transmitting air data parameters and health status parameters associated with the air data probe to the one or more other air data probes.

19 Claims, 3 Drawing Sheets

(58) Field of Classification Search
USPC .................................................. 340/870.07
See application file for complete search history.

(56) References Cited

U.S. PATENT DOCUMENTS

| | | | | |
|---|---|---|---|---|
| 8,275,313 | B1* | 9/2012 | Myers | H04W 84/18 455/41.2 |
| 9,796,479 | B2 | 10/2017 | Tucker et al. | |
| 9,841,304 | B2 | 12/2017 | Chong et al. | |
| 2007/0200688 | A1* | 8/2007 | Tang | B60R 25/04 340/426.18 |
| 2009/0243895 | A1* | 10/2009 | Mitchell | H01C 21/007 340/971 |
| 2009/0325495 | A1* | 12/2009 | LaBerge | H04W 16/14 455/63.1 |
| 2010/0277345 | A1* | 11/2010 | Rodriguez | G01T 1/167 340/945 |
| 2011/0300880 | A1* | 12/2011 | Muller | G01S 5/0289 455/456.1 |
| 2013/0003620 | A1* | 1/2013 | Dame | H01C 21/007 370/310 |
| 2017/0127220 | A1* | 5/2017 | Rosti | G06F 30/20 |
| 2017/0153073 | A1 | 6/2017 | Bumgardner et al. | |
| 2018/0082558 | A1* | 3/2018 | Riedel | G08B 21/16 |
| 2018/0338003 | A1* | 11/2018 | Carlson | H04W 4/70 |
| 2019/0319786 | A1* | 10/2019 | Das | H04L 9/0869 |

OTHER PUBLICATIONS

Bai et al., "Wireless Sensor Network for Aircraft Health Monitoring," IEEE, Proceedings of the First International Conference on Broadband Networks, Oct. 25, 2004, 3 pages.
Chessa et al., "Comparison-Based System-Level Fault Diagnosis in Ad Hoc Networks," IEEE, Proceedings of the 20th Symposium on Reliable Distributed Systems, Oct. 28, 2001, 10 pages.
European Search Report; European Application No. 19212332.1; Application Filed: Nov. 28, 2019; Report dated Jun. 22, 2020; 13 pages.
Minet et al., "Adaptive Wireless Sensor Networks for Aircraft," IEEE, International Conference on Wireless for Space and Extreme Environments, Dec. 14, 2015, 6 pages.

* cited by examiner

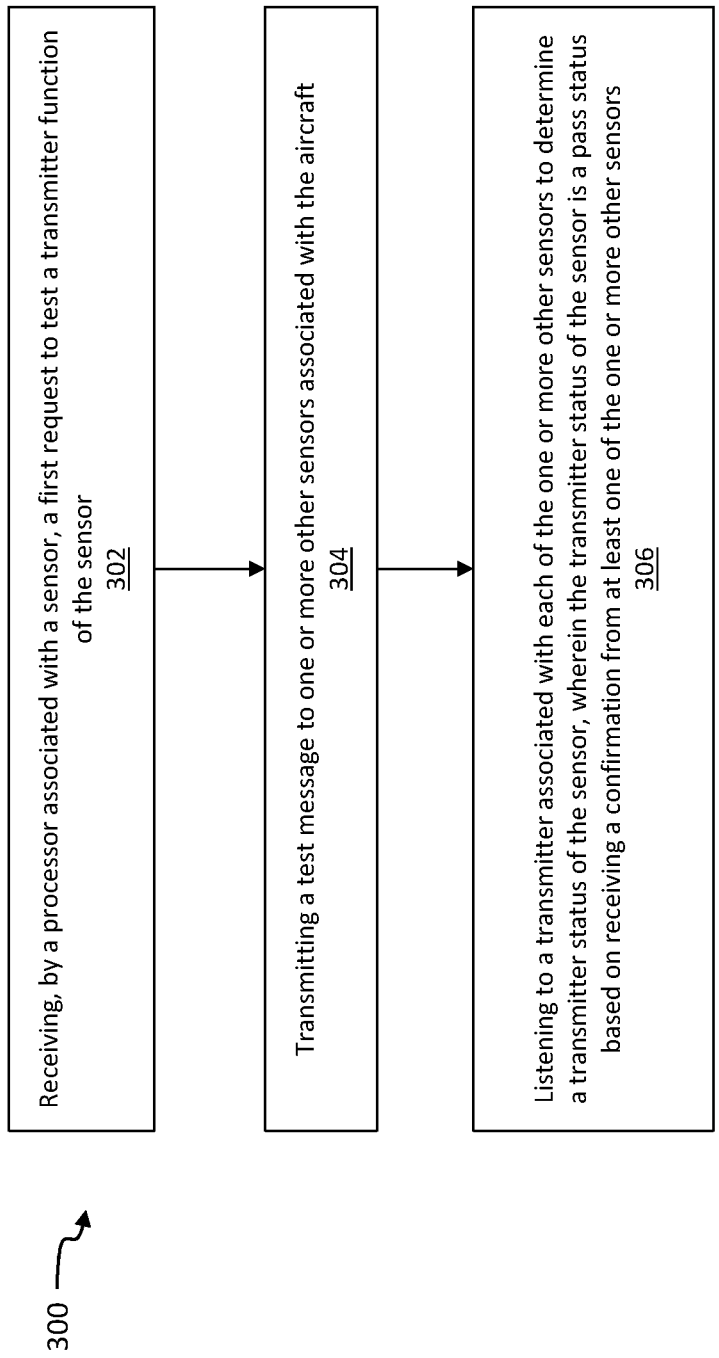

WIRELESS COMMUNICATION FOR AIR DATA SYSTEM

CROSS-REFERENCE TO RELATED APPLICATIONS

This application claims the benefit of Indian provisional application no. 201911011201 filed Mar. 22, 2019, which is incorporated herein by reference in its entirety.

BACKGROUND

Exemplary embodiments pertain to the art of avionics communication and more particularly to wireless communication and testing for an air data system.

Architecture of aircraft is evolving based on application needs, customer needs, market segments and the availability of advanced technologies. In the process there are attempts to make aircraft more intelligent, more electrical and more data driven. Considering the cost of an aircraft design life cycle and operations, it is very important to have modular and re-usable architecture while still maintaining robustness and reliability of the design.

Air data systems provide information to an aircraft and a pilot throughout a flight regime. This system can be utilized to measure total pressure, impact pressure, angle of attack, static pressure, and angle of sideslip parameters. These parameters being measured are utilized to calculate airspeed, altitude, attitude, speed, etc. Air data systems, typically, feed data to other aircraft systems such as, for example, air data inertial reference units (ADIRU), flight management systems (FMS), displays, flight control engines (FCE), and in-flight entertainment systems (IFE).

At present, aircrafts are fitted with multiple air data probes on different sides of an aircraft for redundancy and dissimilarity in computation of air data parameters. The air data probes form pairs and electrical coupling over physical wiring in the aircraft. The physical wiring typically includes interfaces such as, for example, avionic buses CAN, Ethernet, ARINC, and the like. Deployment of wired interfaces involves significant manual effort leading to sub-optimal configurations and higher deployment time and costs, increased weight, and limiting for the flexibility of modularity. Also, scalability of large wired interfaces is limited by challenges in cable routing and associated certification activities.

BRIEF DESCRIPTION

Disclosed is an air data probe. The air data probe includes a housing including one or more sensors and a wireless interface, the wireless interface comprising a transmitter and a receiver, wherein the wireless interface is configured to receive a first request to test the transmitter, transmit a test message to one or more other air data probes associated with an aircraft, and listen to a transmitter associated with each of the one or more other air data probes to determine a transmitter status of the transmitter, wherein the transmitter status is a pass status based on receiving a confirmation from at least one of the one or more other air data probes.

Also disclosed is a method for operating sensors associated with an aircraft that includes receiving, by a processor associated with a sensor, a first request to test a transmitter function of the sensor, transmitting a test message to one or more other sensors associated with the aircraft, and listening to a transmitter associated with each of the one or more other sensors to determine a transmitter status of the sensor, wherein the transmitter status of the sensor is a pass status based on receiving a confirmation from at least one of the one or more other sensors.

Disclosed is an air data system. The system includes a plurality of air data probes each comprising one or more sensor and a wireless interface, wherein the plurality of air data probes are communicatively coupled to each other, an air data controller configured to designate a first air data probe from the plurality of air data probes as a probe under test, transmit, through the first air data probe, a test message to one or more other air data probes of the plurality of air data probes, and listen, through a receiver of the first air data probe, to a transmitter associated with each of the one or more other air data probes to determine a transmitter status of a transmitter of the first air data probe, wherein the transmitter status is a pass status based on receiving, by the first air data probe, a confirmation from at least one of the one or more other air data probes.

BRIEF DESCRIPTION OF THE DRAWINGS

The following descriptions should not be considered limiting in any way. With reference to the accompanying drawings, like elements are numbered alike:

FIG. 3 is a process flow of a method in accordance with an embodiment of the disclosure.

DETAILED DESCRIPTION

A detailed description of one or more embodiments of the disclosed apparatus and method are presented herein by way of exemplification and not limitation with reference to the Figures.

Air data systems utilize air data probes to collect information associated with an aircraft. This information includes airspeed, altitude, aircraft speed, attitude, and the like. Communication between the air data probes, the air data system, and other external systems on an aircraft is typically done through wired connections. These wired connections offer a challenge in deployment of the air data system as well as any maintenance, replacement, or changes for the air data system. In current aircraft, the configuration of communication channels between air data probes is fixed and cannot be modified without changing hardware. Also, changes to the system require the communication interfaces, harnesses, and wire harnesses to be redesigned for each type of aircraft. For adding new air data probes, new physical wiring is required. This wiring adds weight to the aircraft leading to lesser fuel efficiency and increased cost to operate the aircraft.

Turning now to an overview of the aspects of the disclosure, one or more embodiments address the above-described challenges in the art by providing systems and processes for deployment of wireless air data systems within an aircraft thus reducing weight, deployment time and costs, and maintenance time and costs. Embodiments herein allow for improved inter air data probe communication architecture that enables configurable communication channels among the air data probes without the need of redesigning the communication interfaces, wiring, and is independent of aircraft type architecture.

Figure 1:
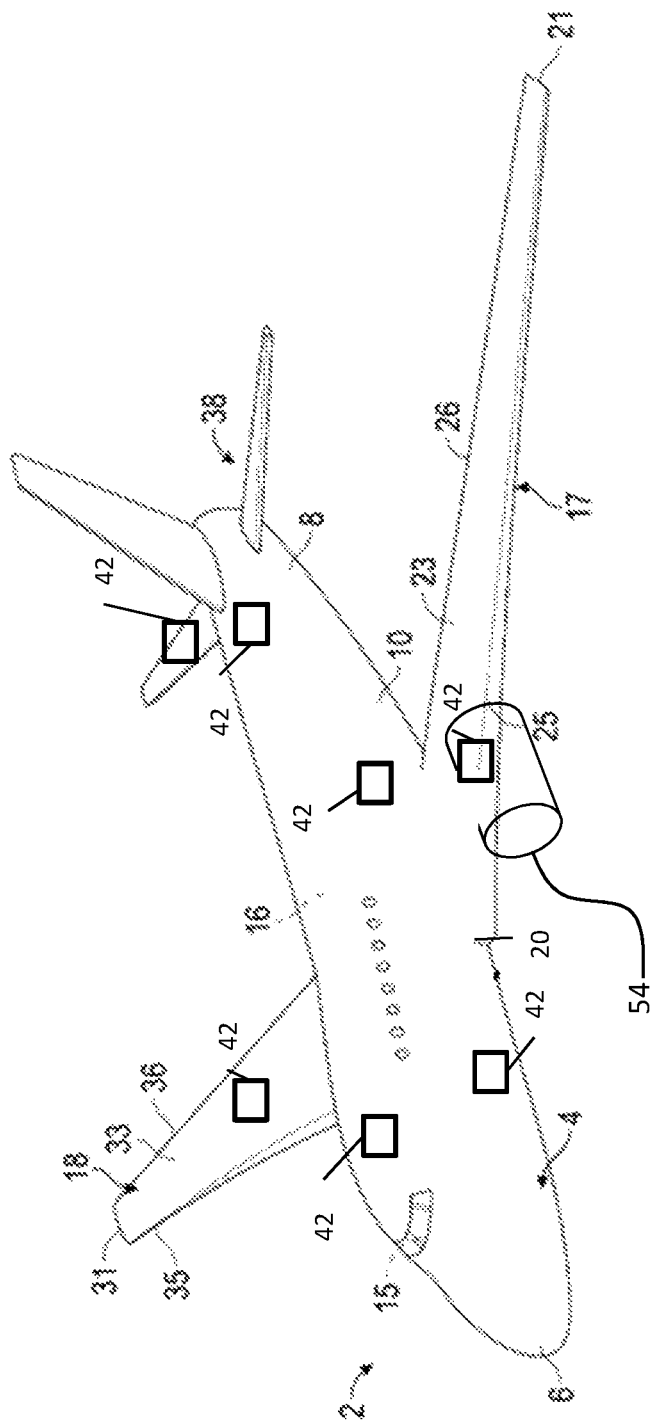
FIG. 1 is a perspective view of an aircraft that may incorporate embodiments of the present disclosure.

Referring now to the figures, FIG. 1 depicts a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2.

In embodiments, the aircraft 2 includes one or more air data interfaces operable to establish wireless communication with a plurality of air data probes 42 and an air data system on the aircraft 2. The air data probes 42 can have different characteristics in terms of data rates and priorities in the context of particular avionic applications. Some probes 42 may only collect data related to altitude or airspeed while other probes 42 may collect data related to all parameters for an air data system.

Figure 2:
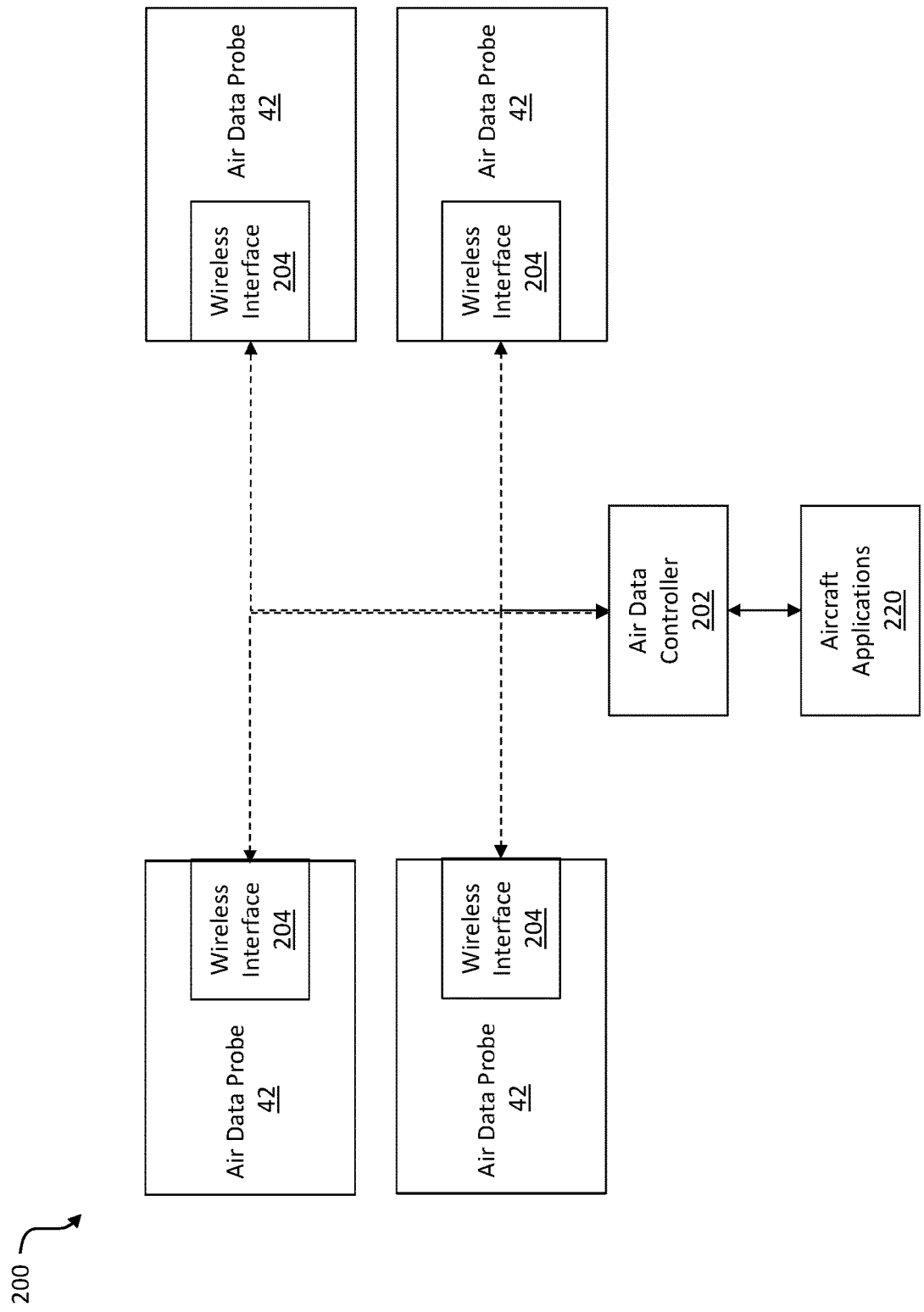
FIG. 2 is a block diagram of a system in accordance with an embodiment of the disclosure.

Turning now to a more detailed description of aspects of the present disclosure, FIG. 2 depicts a diagram of a wireless air data system according to one or more embodiments. The air data system 200 includes an air data controller 202 that can connect to a plurality of air data probes 42. As described in FIG. 1, the air data probes 42 can be arranged at different locations on an aircraft to collect data associated with the aircraft. The air data probes 42 can connect to the air data controller 202 and to each other through a wireless interface 204. In embodiments, the wireless interface 204 can be in electronic communication with the air data probe 42 and housed within the air data probe 42 assembly. In one or more embodiments, the air data probe 42 includes the wireless interface 204 which includes a communication service coordinator (CSC), a configuration memory (CM), and a built-in self-test (BIST). The air data probes 42 housing includes this wireless interface 204 and functional components utilized for collecting air data parameters associated with an aircraft. These different components will be discussed in further detail below. Although the illustrated example in FIG. 2 includes a separate air data controller 202, in one or more embodiments, each of the air data probes 42 can include a controller that can perform the functions of the air data controller 202 described herein. That is to say, each of the air data probes 42 can perform parameter calculations and communicate with other air data probes 42 and external aircraft applications 220 without an external air data controller 202. For ease of explanation, the air data controller 202 will be described separately.

In one or more embodiments, the wireless interface 204 can be a separate circuit card assembly (CCA) that is electrically coupled to the other functional components of the air data probe 42 over separate physical connects to enable exchange of air data parameters, performance parameters, and health status. The air data functional components are a different circuit card assembly hosting a sensor system for computation of different air data parameters. The wireless interface 204 includes a wireless transceiver which enables communication with other air data probes 42 and the air data controller 202. The wireless interface 204 enables pair formation and coupling among and between different air data probes 42 on a wireless link and also supports communication with other aircraft applications 220 requiring communication with the air data probes 42.

In one or more embodiments, a configuration memory (CM) is included in the wireless interface 204. The configuration memory is a software database that defines the characteristics properties/specifications of the communication channels among air data probes 42 and other air data consuming systems (e.g., air data controller 202 and other aircraft applications 220). The configuration memory also includes air data probe 42 communication channel specifications, details on any other line replacement units (LRU) communication channel specifications, and details on air data parameters, performance indicators, and health status information to be transmitted from the air data probe 42. The configuration memory is maintained as a copy in all of the air data probes 42 to configure the air data probes 42 transmitters and receivers (transceivers) attributes as per the air data probe 42 communication specifications.

An exemplary database for air data probe communication specifications is shown in Table 1 below. The specifications includes the device identification information in terms of device ID and the device name, the details of transmit ports in terms of transmit frequency band, transmission rate, and details of encryption.

TABLE 1

Air Data Probe Communication Specification

| Device ID | Device Name | Tx Frequency | Tx Rate | Encryption Information |
|---|---|---|---|---|
| 1 | Left Probe 1 | Tx1 | Rx1 | Encrypt Key 1 |
| 2 | Left Probe 2 | Tx2 | Rx2 | Encrypt Key 2 |
| 3 | Right Probe 1 | Tx3 | Rx3 | Encrypt Key 3 |
| 4 | Right Probe 2 | Tx4 | Rx4 | Encrypt Key 4 |

The device ID and Device name supports with configuration of a transceiver from where air data parameters will be transmitted. Tx Frequency defines the characteristics of the transmit channel. Tx Rate defines the speed at which the transmit channel would broadcast messages. And encryption information is related to cryptography for the transceiver channels to encrypt and decrypt the data for security.

The other LRU communication specification can be used by the air data probes 42 to configure their transceivers as per other LRU specifications to receive parameters required for air data computation, compensation, and correction such as, for example, landing gear status, icing information, flat and slat deployment status, UTC date and time, TAT information, and the like. A line-replaceable unit is a modular component of an aircraft that is designed to be replaced quickly at an operating location (e.g., $1^{st}$ line). An LRU is typically a sealed unit such as a radio or other auxiliary equipment. An exemplary LRU communication is shown in table 2 below.

TABLE 2

Other LRU Communication Specifications

| Device ID | Device Name | Tx Frequency | Tx Rate | Encryption Information |
|---|---|---|---|---|
| 5 | FCE | Tx5 | Rx5 | Encrypt Key 5 |
| 6 | FMS | Tx6 | Rx6 | Encrypt Key 6 |
| 7 | ECS | Tx7 | Rx7 | Encrypt Key 7 |
| 8 | IFE | Tx8 | Rx8 | Encrypt Key 8 |

The device ID and device name provides name of the other LRUs from where data is received. Tx frequency defines the characteristics of the transmit channel of the other LRUs. Tx Rate defines the speed rate at which the transmit channel of the other LRU would send the information to air data probes 42. And encryption information is related to cryptography for the transmitter of the LRU and the receiver channel of the air data probe 42 to encrypt and decrypt the data for security.

In one or more embodiments, the other LRUs also includes the air data probe 42 transmit parameter information like device information and parameters that need to be transmitted from that device as further shown in table 3 below.

TABLE 3

Air Data Probe Transmit Parameters Database

| Device ID | Device Name | Parameter 1 | Parameter 2 | Parameter 3 |
|---|---|---|---|---|
| 1 | Left Probe 1 | YES | YES | YES |
| 2 | Left Probe 2 | NO | NO | YES |
| 3 | Right Probe 1 | YES | YES | YES |
| 4 | Right Probe 2 | NO | NO | YES |

In one or more embodiments, the parameters that need to be transmitted from a particular air data probe 42 is marked as "YES". The parameters that are restricted from transmission are marked as "NO". The parameters 1, 2, 3, etc. are air data probe output parameters which include measured parameters, local condition parameters, aircraft condition parameters, aircraft air data parameters, flight condition dependent parameters, and health management parameters. Health management parameters can include faults, failures and other values that facilitate evaluation of the health of the air data probe 42. The configuration memory of the wireless interface 204 can also be utilized for storing and retrieving special data upon request from maintenance or ground operations. These data can be transmitted to a requesting system automatically or on demand.

In one or more embodiments, the wireless interface 204 of the air data probes 42 also includes a communication service coordinator (CSC) which provides capabilities to handle multiple wireless communication channels, multiple wireless communication protocols, and different modes of operations like inter probe communication, other LRUs communication, and maintenance operation of air data probes 42. The CSC adds to the software based configurability of communication protocols by reading the information from the Configuration Memory and performs pair formation between inter air data probe communications channels and other LRUs communicating with the air data probes during power up and reset operations.

In one or more embodiments, the CSC configures the transmit channel of an air data probe as a wireless access point for receivers of other air data probes and consuming LRUs to receive the air data information messages. The CSC provides for the broadcasting of messages for a health management system for the aircraft. The CSC also configures the receiver channels to listen to other air data probe and LRUs communicating to air data probes to receive the air data parameters and other parameters impacting air data computation. The CSC works as a gateway for various air data functional component channels that may be housed in the same assembly of an air data probe 42 for maintenance mode operations.

In one or more embodiments, the CSC of the wireless interface 204 can utilize a handshake protocol with wireless maintenance agents via a bridge such as, for example an aircraft interface device (AID) and command the air data functional component channels to go to maintenance mode and perform maintenance operations as directed by a maintenance agent. In embodiments, the CSC performs an authentication operation to recognize a wireless bridge and maintenance agent for accepting the maintenance command. The CSC identifies the functional component card that needs to be sent to the maintenance mode by deciphering the command from the maintenance agent and sending the functional component card to maintenance mode by communicating over a physical medium. Once the required functional component card is in maintenance mode, the CSC receives further commands from the maintenance agent and makes the functional component card perform the maintenance action as required. The maintenance action can include software updates, fault and failure data downloading, and providing software revisions and cyclic redundancy check (CRC) operations. The CSC also receives an acknowledgement from the functional component card under maintenance mode and passes on the acknowledgement to the maintenance agent.

In one or more embodiments, the wireless interface is equipped with built-in self-tests (BIST) and loops back test mechanisms to perform continuous testing of the transceiver module and communicates the status to the CSC. The CSC recognizes any failure and stops transmission from the failed module (i.e., the air data probe). In one or more embodiments, the CSC can identify a communication failure from other air data probes and intimate the other air data channels and LRUs connected to the air data probe about the failure. The CSC process supports the air data channels for applying the priority and reversion logic (i.e., calculating data with parameters from other available probes). In one or more embodiments, the evaluation of transmission or reception status of an air data probe is determined by using validation logic defined in a BIST-Tx/Rx validation table illustrated in Table 4 below.

TABLE 4

BIST - Tx/Rx Validation Table

| Probe # | Received from Probe #1 (Yes/No) | Received from Probe #2 (Yes/No) | Received from Probe #3 (Yes/No) | Received from Probe #4 (Yes/No) |
|---|---|---|---|---|
| 1 | N/A | | | |
| 2 | | N/A | | |
| 3 | | | N/A | |
| 4 | | | | N/A |

The validation logic utilizes a self and cross evaluation status technique from each air data probe. With the cross-evaluation status technique, an air data probe under test is able to transmit or receive as evaluated by other probes. With the self-evaluation technique, the other probes are able to transmit or receive as evaluated by the air data probe under test. For example, when testing the transmitter status evaluation of Probe #1 (probe under test), the receiver listens to the transmitters of the other probes (e.g., Probe #2, 3, and 4). If the other probes confirm that they have not received the message from Probe #1, then the BIST in the CSC confirms that the probe under test (Probe #1) transmitter is not working. This testing can be repeated for the other probes. In the case of receiver status evaluation, the probe under test (Probe #1) receiver listens to the transmitters of all other probes (i.e., Probe #2, 3, and 4). If the probe under test is able to receive information from any of the other probe transmitters, the probe under test sets the receiver status to successful. If no valid transmit messages are received from any of the other probes, the probe under test is set to fail.

In one or more embodiments, the air data probes 42 communicate the performance and health management information to a health management system. In one or more embodiments, the health management system is communicated to through the wireless interfaces 204 directly or the air data controller 202, if a separate air data controller 202 is utilized, and can be considered one of the aircraft applications 220. The following process can be utilized for communicating the performance and health management information to the health management system. Upon powering up of the air data probe, the air data probe can perform the transmitter and receiver self-evaluation testing and the cross-evaluation testing outlined above. Upon passing this testing, the air data probe computes the performance and health parameters taken from the testing and provides these parameters to the CSC on the physical link between the functional components of the air data probe and the wireless interface. The CSC then encrypts the received performance and health parameters and transmits these parameters over the wireless link at the rate defined in the air data probe specification. This process can be repeated for each air data probe in an aircraft.

In one or more embodiments, the CSC checks the authenticity of the maintenance agent requesting the maintenance mode and upon successful authorization coordinates between the maintenance agent and the air data probe functional channel for maintenance operations. In embodiments, the CSC can receive a maintenance command from the maintenance agent and make the air data probe functional channel perform the action as commanded by the maintenance agent. This enables packet by packet passing of software received from the maintenance agent and provides the status of updates to the agent from the air data channel for wireless data loading of the software update. Also, this supports with downloading and clearing of fault and failure data. Once the maintenance operation is completed, the CSC supports with exit of maintenance mode and starts with normal operation.

FIG. 3 depicts a flow diagram of a method for operating sensors in an aircraft according to one or more embodiments. The method 300 includes receiving, by a processor associated with a sensor, a first request to test a transmitter function of the sensor, as shown in block 302. The method 300, at block 304, includes transmitting a test message to one or more other sensors associated with the aircraft. And at block 306, the method 300 includes listening to a transmitter associated with each of the one or more other sensors to determine a transmitter status of the sensor, wherein the transmitter status of the sensor is a pass status based on receiving a confirmation from at least one of the one or more other sensors.

Additional processes may also be included. It should be understood that the processes depicted in FIG. 3 represent illustrations and that other processes may be added or existing processes may be removed, modified, or rearranged without departing from the scope and spirit of the present disclosure.

In embodiments, the air data controller 202, air data probes 42, any of the hardware referenced in the system 200 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air data probe comprising:
a housing;
a sensor; and
a wireless interface in operable communication with the sensor, the wireless interface comprising a transmitter and a receiver;
the wireless interface being configured to:
receive a first request to test the transmitter;
transmit a test message to one or more other air data probes associated with an aircraft;
listen to an additional transmitter associated with each of the one or more other air data probes to determine a health status of the air data probe, wherein the health status may be a pass status based on receiving a confirmation from at least one of the one or more other air data probes or may be a fail status based on not receiving a confirmation from any of the one or more other air data probes; and
provide the health status to a health management system by creating an encrypted message with the transmitter status and wirelessly transmitting to the encrypted message to the health management system.

2. The air data probe of claim 1, wherein the wireless interface is further configured transmit air data parameters and health status parameters associated with the air data probe to the one or more other air data probe.

3. The air data probe of claim 1, wherein the wireless interface is further configured to:
    receive a second request to test the receiver; and
    listen to the additional transmitter associated with each of the one or more other air data probes to determine a receiver status of the air data probe, wherein the receiver status is a pass status based on receiving information associated with at least one of the one or more other air data probes.

4. The air data probe of claim 3, wherein the health status is a fail status based on not receiving information associated with any of the one or more other air data probes.

5. The air data probe of claim 1, wherein the transmitting the test message to one or more other air data probes is performed through a wireless channel.

6. The air data probe of claim 1, wherein the wireless interface is further configured to provide the health status to a health management system.

7. The air data probe of claim 3, wherein the wireless interface is further configured to provide the receiver status to a health management system.

8. A method for operating sensors in an aircraft, the method comprising:
    receiving, by a processor associated with a sensor, a first request to test a transmitter function of the sensor;
    transmitting a test message to one or more other sensors associated with the aircraft; and
    listening to an additional transmitter associated with each of the one or more other sensors to determine a health status of the sensor, wherein the health status of the sensor may be a pass status based on receiving a confirmation from at least one of the one or more other sensors or may be a fail status based on not receiving a confirmation from any of the one or more other sensors; and
    providing the health status to a health management system by creating an encrypted message with the transmitter status and wirelessly transmitting to the encrypted message to the health management system.

9. The method of claim 8, further comprising:
    receiving, by the processor, a second request to test a receiver function of the sensor; and
    listening to the transmitter associated with each of the one or more other sensors to determine a receiver status of the sensor, wherein the receiver status of the sensor is a pass status based on receiving information associated with at least one of the one or more other sensors.

10. The method of claim 9, wherein the receiver status of the sensor is a fail status based on not receiving information associated with any of the one or more other sensors.

11. The method of claim 8, wherein the transmitting the test message to one or more other sensors is performed through a wireless channel.

12. The method of claim 8, wherein the sensor is an air data probe.

13. The method of claim 8, further comprising: providing the transmitter status to a health management system.

14. The method of claim 9, further comprising: providing the receiver status to a health management system.

15. An air data system for an aircraft, the air data system comprising:
    a plurality of air data probes each comprising a sensor and a wireless interface, wherein the plurality of air data probes are communicatively coupled to each other;
    an air data controller configured to:
        designate a first air data probe from the plurality of air data probes as a probe under test;
        transmit, through the first air data probe, a test message to one or more other air data probes of the plurality of air data probes; and
    listen, through a receiver of the first air data probe, to an additional transmitter associated with each of the one or more other air data probes to determine a health status of a transmitter of the first air data probe, wherein the health status is a pass status based on receiving, by the first air data probe, a confirmation from at least one of the one or more other air data probes; and
    provide the health status to a health management system by creating an encrypted message with the transmitter status and wirelessly transmitting to the encrypted message to the health management system.

16. The air data system of claim 15, wherein the health status is a fail status based on not receiving, by the first air data probe, a confirmation from at least one of the one or more other air data probes.

17. The air data system of claim 15, wherein the air data controller is further configured to:
    cause the other air data probes to transmit a second test message to the first air data probe; and
    determine a receiver status of a receiver of the first air data probe based on the second test message, wherein the receiver status is a pass status based on receiving, by the air data probe, the second test message from at least one of the one or more other air data probes.

18. The air data system of claim 17, wherein the receiver status is a fail status based on not receiving, by the air data probe, the second test message from at least one of the one or more other air data probes.

19. The air data system of claim 15, wherein the air data controller is further configured to provide the transmitter status to a health management system.

* * * * *